(12) United States Patent
Fux et al.

(10) Patent No.: US 12,487,918 B2
(45) Date of Patent: Dec. 2, 2025

(54) WEAR-LEVEL CONTROL CIRCUIT FOR MEMORY MODULE

(71) Applicant: SUNRISE MEMORY CORPORATION, San Jose, CA (US)

(72) Inventors: Shay Fux, Kfar Yona (IL); Amotz Yagev, Sdot Yam (IL); Sagie Goldenberg, Gaaton (IL)

(73) Assignee: SUNRISE MEMORY CORPORATION, San Jose, CA (US)

( * ) Notice: Subject to any disclaimer, the term of this patent is extended or adjusted under 35 U.S.C. 154(b) by 0 days.

(21) Appl. No.: 18/229,060

(22) Filed: Aug. 1, 2023

(65) Prior Publication Data

US 2024/0045796 A1 Feb. 8, 2024

Related U.S. Application Data

(60) Provisional application No. 63/370,471, filed on Aug. 4, 2022.

(51) Int. Cl.
*G06F 12/02* (2006.01)
*G06F 11/07* (2006.01)
*G06F 12/1009* (2016.01)

(52) U.S. Cl.
CPC ...... *G06F 12/0246* (2013.01); *G06F 11/0772* (2013.01); *G06F 12/1009* (2013.01); *G06F 2212/7211* (2013.01)

(58) Field of Classification Search
CPC ............. G06F 12/0246; G06F 11/0772; G06F 12/1009; G06F 2212/7211; G06F 3/0616; G06F 3/0647; G06F 3/0659; G06F 3/0679; G06F 12/0238; G06F 2212/1024; G06F 2212/7201; G06F 2212/7208

See application file for complete search history.

(56) References Cited

U.S. PATENT DOCUMENTS

| | | | |
|---|---|---|---|
| 10,459,662 B1 * | 10/2019 | Volpe | G06F 12/0246 |
| 11,269,779 B2 | 3/2022 | Shah et al. | |
| 2009/0144732 A1 * | 6/2009 | Tanaka | G06F 3/0631 718/1 |
| 2018/0088810 A1 * | 3/2018 | Ramalingam | G06F 3/0659 |
| 2019/0108889 A1 * | 4/2019 | Gholamipour | G06F 12/0623 |
| 2022/0113870 A1 * | 4/2022 | Cho | G06F 12/0246 |
| 2022/0374305 A1 * | 11/2022 | Yeap | G06F 12/0246 |
| 2023/0027837 A1 | 1/2023 | Petti et al. | |
| 2023/0195314 A1 | 6/2023 | Masahiro et al. | |
| 2023/0305699 A1 * | 9/2023 | Shah | G06F 3/0604 |
| 2023/0378979 A1 * | 11/2023 | Anderson | H03M 13/1515 |

OTHER PUBLICATIONS

Qureshi et al., "Enhancing Lifetime and Security of PCM-Based Main Memory with Start-Gap Wear Leveling," Micro'09, Dec. 12-16, 2009, New York, NY, USA, 10 pages.
Qureshi et al., "Practical and Secure PCM Systems by Online Detection of Malicious Write Streams," IEEE, 12 pages.

* cited by examiner

*Primary Examiner* — Michael Alsip
*Assistant Examiner* — Jonah C Krieger

(57) ABSTRACT

A memory device includes: (a) one or more memory circuits having physical memory pages identified by physical page addresses, each physical memory page being provided to store a memory page; and (b) a control circuit configured for managing read or write operations in each memory circuit. The control circuit manages both a wear-leveling scheme and read and write operations in the memory circuits.

27 Claims, 12 Drawing Sheets

| WL, Page, Bank | Initial Mapped Page | Current Mapped Page |
|---|---|---|
| 0,0,0 | A | A |
| 0,0,1 | B | B |
| 0,0,2 | C | C |
| 0,0,3 | D | D |
| 0,1,0 | E | E |
| 0,1,1 | F | F |
| 0,1,2 | G | G |
| 0,1,3 | H | H |
| 1,0,0 | I | I |
| 1,0,1 | J | J |
| 1,0,2 | K | K |
| 1,0,3 | L | L |
| 1,1,0 | M | M |
| 1,1,1 | N | N |
| 1,1,2 | O | O |
| 1,1,3 | P | P |
| <spare> | SP | SP |

FIG. 4(a)

| WL, Page, Bank | Initial Mapped Page | Current Mapped Page |
|---|---|---|
| 0,0,0 | A | A |
| 0,0,1 | B | B |
| 0,0,2 | C | C |
| 0,0,3 | D | D |
| 0,1,0 | E | E |
| 0,1,1 | F | F |
| 0,1,2 | G | G |
| 0,1,3 | H | H |
| 1,0,0 | I | I |
| 1,0,1 | J | J |
| 1,0,2 | K | K |
| 1,0,3 | L | L |
| 1,1,0 | M | M |
| 1,1,1 | N | N |
| 1,1,2 | O | O |
| 1,1,3 | P | SP |
| <spare> | SP | P |

FIG. 4(b)

| WL, Page, Bank | Initial Mapped Page | Current Mapped Page |
|---|---|---|
| 0,0,0 | A | A |
| 0,0,1 | B | B |
| 0,0,2 | C | C |
| 0,0,3 | D | D |
| 0,1,0 | E | E |
| 0,1,1 | F | F |
| 0,1,2 | G | G |
| 0,1,3 | H | H |
| 1,0,0 | I | I |
| 1,0,1 | J | J |
| 1,0,2 | K | K |
| 1,0,3 | L | L |
| 1,1,0 | M | M |
| 1,1,1 | N | N |
| 1,1,2 | O | SP |
| 1,1,3 | P | O |
| <spare> | SP | P |

FIG. 4(c)

| WL, Page, Bank | Initial Mapped Page | Current Mapped Page |
|---|---|---|
| 0,0,0 | A | SP |
| 0,0,1 | B | A |
| 0,0,2 | C | B |
| 0,0,3 | D | C |
| 0,1,0 | E | D |
| 0,1,1 | F | E |
| 0,1,2 | G | F |
| 0,1,3 | H | G |
| 1,0,0 | I | H |
| 1,0,1 | J | I |
| 1,0,2 | K | J |
| 1,0,3 | L | K |
| 1,1,0 | M | L |
| 1,1,1 | N | M |
| 1,1,2 | O | N |
| 1,1,3 | P | O |
| <spare> | SP | P |

FIG. 4(d)

| WL, Page, Bank | Initial Mapped Page | Current Mapped Page |
|---|---|---|
| 0,0,0 | A | P |
| 0,0,1 | B | A |
| 0,0,2 | C | B |
| 0,0,3 | D | C |
| 0,1,0 | E | D |
| 0,1,1 | F | E |
| 0,1,2 | G | F |
| 0,1,3 | H | G |
| 1,0,0 | I | H |
| 1,0,1 | J | I |
| 1,0,2 | K | J |
| 1,0,3 | L | K |
| 1,1,0 | M | L |
| 1,1,1 | N | M |
| 1,1,2 | O | N |
| 1,1,3 | P | O |
| <spare> | SP | SP |

FIG. 4(e)

| WL, Page, Bank | Initial Mapped Page | Current Mapped Page |
|---|---|---|
| 0,0,0 | A | P |
| 0,0,1 | B | A |
| 0,0,2 | C | B |
| 0,0,3 | D | C |
| 0,1,0 | E | D |
| 0,1,1 | F | E |
| 0,1,2 | G | F |
| 0,1,3 | H | G |
| 1,0,0 | I | H |
| 1,0,1 | J | I |
| 1,0,2 | K | J |
| 1,0,3 | L | K |
| 1,1,0 | M | L |
| 1,1,1 | N | M |
| 1,1,2 | O | N |
| 1,1,3 | P | SP |
| <spare> | SP | O |

FIG. 4(f)

| Page Address (WL, Page, Bank) | Hashed Page Address | Initial Mapping | Mapping after First Replacement Cycle |
|---|---|---|---|
| (0,0,0) | (1,0,2) | A | P |
| (0,0,1) | (1,1,3) | B | E |
| (0,0,2) | (0,0,0) | C | B |
| (0,0,3) | (0,1,1) | D | G |
| (0,1,0) | (1,1,2) | E | L |
| (0,1,1) | (1,0,3) | F | A |
| (0,1,2) | (0,1,0) | G | N |
| (0,1,3) | (0,0,1) | H | C |
| (1,0,0) | (0,0,2) | I | H |
| (1,0,1) | (0,1,3) | J | M |
| (1,0,2) | (1,0,0) | K | J |
| (1,0,3) | (1,1,1) | L | O |
| (1,1,0) | (0,1,2) | M | D |
| (1,1,1) | (0,0,3) | N | I |
| (1,1,2) | (1,1,0) | O | F |
| (1,1,3) | (1,0,1) | P | K |
| <spare> | <spare> | <SP> | <SP> |

FIG. 8

WEAR-LEVEL CONTROL CIRCUIT FOR MEMORY MODULE

CROSS-REFERENCE TO RELATED APPLICATIONS

The present application claims priority to U.S. provisional application ("Parent Application"), Ser. No. 63/370,471, entitled "WEAR-LEVEL CONTROL CIRCUIT FOR MEMORY MODULE," filed on Aug. 4, 2022.

The present application is also related to (i) U.S. patent application ("Non-Provisional Application I"), Ser. No. 17/812,375, entitled "3-Dimensional Memory String Array of Thin-Film Ferroelectric Transistors," filed on Jul. 13, 2022, published as US 2023/0027837 A1, which claims priority to U.S. provisional patent application, Ser. No. 63/222,926, entitled "3-Dimensional Memory String Array of Thin-Film Ferroelectric Transistors," filed on Jul. 16, 2021, and (ii) U.S. patent application ("Non-Provisional Application II"), Ser. No. 18/059,971, entitled "Memory System Implementing Write Abort Operation For Reduced Read Latency," filed on Nov. 29, 2022, published as US 2023/0195314 A1, which claims priority of U.S. provisional patent application, Ser. No. 63/287,786, entitled "Memory System Implementing Write Abort Operation For Reduced Read Latency," filed on Dec. 9, 2021.

The disclosure of the Parent Application and the Non-Provisional Applications I and II are hereby incorporated by reference in their entireties.

BACKGROUND OF THE INVENTION

Field of the Invention

The present invention relates to wear-leveling in memory circuits. In particular, the present invention relates to methods and circuits for wear-leveling of a memory circuit with disparate processing times for read and write operations.

Discussion of the Related Art

In this description, the term "memory circuit" refers broadly to any structure, component, integrated circuit, circuit, device, or any combination thereof, suitable for use either in main memory applications (e.g., dynamic random-access memory (DRAM) circuits, static random-access memory (SRAM) circuits, and quasi-volatile memory (QV memory) circuits), or in secondary memory applications (e.g., QV memory circuits and various non-volatile memory circuits, such as flash memory circuits and solid-state drives (SSDs)). Also, the term "storage transistor" is used herein interchangeably with the term "memory transistor."

Furthermore, in the following detailed description, the term "memory page" refers to a logical unit of data, independent of its instantiation. Each memory page is typically identified by a memory page address, or simply "page address." The term "physical memory page" refers to a physical unit of storage or memory (e.g., in a memory circuit), in which a memory page can be instantiated. Each physical memory page is identified by a corresponding physical page address. In a given memory system, physical memory pages and physical page addresses are typically related to some extent to the hardware design. Memory pages and page addresses are abstractions of physical memory pages and physical page addresses, respectively, which are designed with the goal of allowing operations at higher levels (e.g., at the application level) to be designed and implemented independently of the underlying hardware design. To carry out a read or write operation on a memory page specified by a page address, the memory page and the page address are translated or mapped to a corresponding physical memory page and a physical page address to perform the operation that must occur at the hardware level.

Many types of storage transistors have limited endurance, so that their performance degrades over time, as the number of write operations accumulates. A memory circuit including such storage transistors may also experience a failure prematurely, being vulnerable to an irregular non-uniform usage pattern across the memory circuit, whether caused maliciously inflicted or unintentionally. One example of such irregular usage patterns includes having one or more such storage transistors be subject to a higher frequency of write operations than typical, so that the storage transistors reach prematurely their endurance limits, thereby causing the memory circuit to fail. For this reason, various management schemes aimed at spreading write operations roughly uniformly over all storage transistors ("wear-leveling") have been devised. Under a wear-leveling scheme, a group of page addresses are selected at designated times under the scheme to be re-mapped to different physical memory pages within a group of the physical memory pages. The group of page addresses and the group of physical memory pages constitute a "wear-leveling pool." For example, a "start-gap" wear-leveling scheme was proposed for phase-change memory circuits in the article, "Enhancing lifetime and security of PCM-based Main Memory with Start-Gap Wear Leveling" ("Qureshi I"), by M. Qureshi et al., 2009 42nd Annual IEEE/ACM International Symposium on Microarchitecture (MICRO), 2009, pp. 14-23. The physical memory pages within the wear-leveling pool are re-mapped at different times and each serve in turn as a designated "gap" location, so that write operations to any of the page address in the wear-leveling pool are more evenly distributed over the physical memory pages in the wear-level pool.

As another example, an adaptive wear-leveling scheme is disclosed in the article, "Practical and Secure PCM systems by Online Detection of Malicious Write Streams" ("Qureshi II"), by M. Qureshi et al., published in 2011 IEEE 17th International Symposium on High Performance Computer Architecture, 2011, pp. 478-489. The adaptive wear-leveling scheme detects high frequency of write operations on a memory line and adjusts the rate of wear-leveling ("replacement rate").

U.S. Pat. No. 11,269,779 to Shah ("Shah"), entitled "MEMORY SYSTEM WITH A PREDICTABLE READ LATENCY FROM MEDIA WITH A LONG WRITE LATENCY," issued on Mar. 8, 2022, also discloses a start-gap wear-leveling scheme to store parity bits of an error correction scheme.

However, none of Qureshi I, Qureshi II, and Shah discloses a comprehensive control circuit configurations suitable for efficiently implementing an effective wear-leveling scheme.

SUMMARY OF THE INVENTION

According to one embodiment of the present invention, a memory device includes: (a) one or more memory circuits having physical memory pages each identified by a physical page address, each physical memory page being provided to store a memory page; and (b) a control circuit configured for managing read or write operations in each memory circuit. The control circuit manages both a wear-leveling scheme and read and write operations in the memory circuits. The control circuit may include (a) an external interface configured for receiving from an external processor read and write requests, (b) an ingress circuit configured for deriving from the read and write requested memory page addresses associated with these read or write requests; (c) an address mapping circuit configured for deriving a modified memory page address from each specified page address, based on a current mapping ("current map") that maps memory page addresses to the modified memory page addresses; (d) a memory interface circuit that includes an address translation circuit configured for deriving from each modified page address a corresponding physical page address to a physical memory page in the memory circuits; and a command control circuit.

According to one embodiment, the memory page address includes a number of fields corresponding to the units of physical organization in the memory circuits, such as dies, channels, banks, word lines, and pages. In one embodiment, the order of the fields are reordered in the modified memory page address. In other embodiments, some fields of the modified memory page address are formed by a hashing function, which may hash a first group of fields in the memory page address with a second group of fields in the memory page address. In some embodiments, the hash function may further hash the modified memory page address with a seed value.

According to one embodiment of the present invention, when a predetermined triggering event occurs, a migration process alters the mapping between modified memory page addresses and physical memory page addresses are changed for wear-leveling purpose. The triggering event may occur at regular intervals, such as completion of a predetermined number of writes. Alternatively, the triggering events may be generated using a statistical process to provide variable triggering intervals. In one embodiment, a write frequency monitoring circuit may generate the triggering event based on the frequency of write operation associated with a monitored memory page address.

The migration process rotates the memory pages in an algorithmic manner over all physical memory pages in the wear-leveling pool, to avoid any one physical memory page being written so frequently as to prematurely reach its endurance limit, either inadvertently or purposefully caused by a malicious actor.

The present invention is better understood upon consideration of the detailed description below in conjunction with the accompanying drawings.

BRIEF DESCRIPTION OF DRAWINGS

FIGS. 4(a), 4(b), 4(c), 4(d), 4(e) and 4(f) illustrate an implementation of a wear-leveling scheme according to one embodiment of the present invention.

FIG. 8 shows a mapping among page addresses, hashed page addresses, initial mapping of physical memory pages, and a mapping of physical memory pages at the end of the first replacement cycle, using the hashed page addresses in the wear-leveling scheme of FIGS. 4(a)-4(f) and a selected seed value, according to one embodiment of the present invention.

DETAILED DESCRIPTION OF THE INVENTION

Figure 1A:
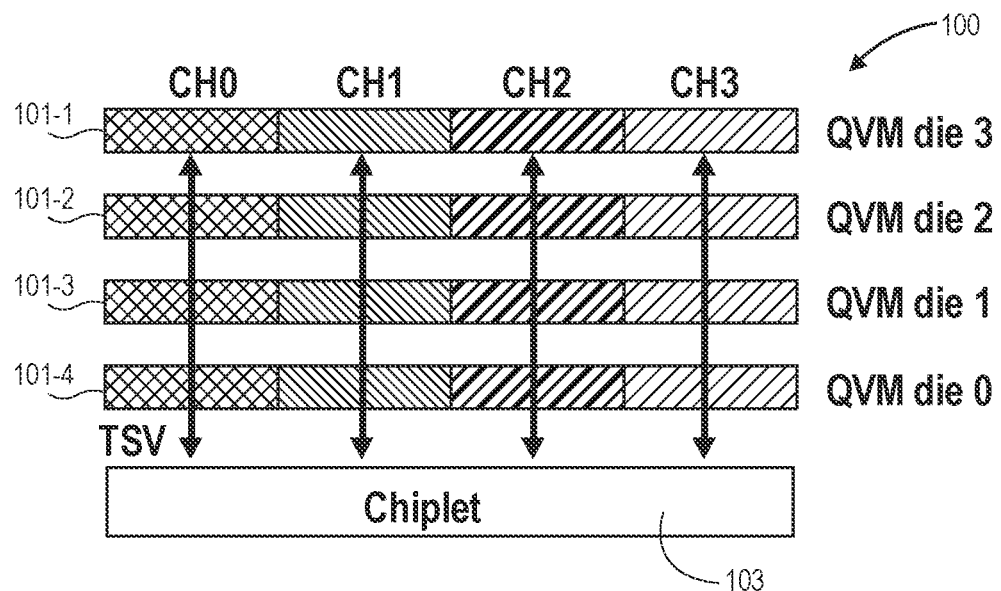
FIGS. 1(a) and 1(b) illustrate multi-die memory module 100 in vertical and horizontal cross-sections, respectively, in accordance with one embodiment of the present invention.
Figure 1B:
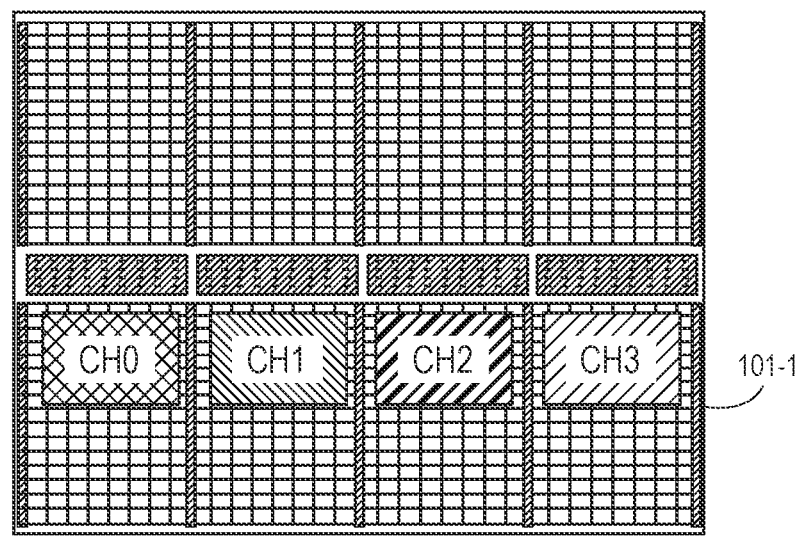

According to one embodiment of the present invention, FIGS. 1(a) and 1(b) illustrate an example of a wear-leveling control circuit in a multi-die memory module. FIG. 1(a) shows a vertical cross section of memory module 100, which includes logic or control circuit 103 that is wafer-bonded, die-bonded or hybrid-bonded to a stack of four memory circuits 101-1, 101-2, 101-3 and 103-4. Logic or control circuit 103 and memory circuits 101-1 to 101-4 are each independently formed on a semiconductor substrate. Thus, each of logic or control circuit 103 and memory circuits 101-1 to 101-4 may be generically referred to as a "semiconductor die". Memory module 100 is suitable for encapsulation in an integrated circuit package (e.g., ball-grid array package) to facilitate placement on a printed circuit board, as is known to those of ordinary skill in the art. In this context, the term "vertical" refers to a direction substantially orthogonal to the planar surface of logic or control circuit 103, and the term "horizontal" may refer to any direction that is substantially orthogonal to the vertical direction. FIG. 1(b) shows a cross section through a horizontal plane of memory circuit 101-1.

As indicated in both FIGS. 1(a) and 1(b), memory circuits 101-1 to 101-4 are each divided into four sections, respectively labeled CH0, CH1, . . . , and CH3. The commonly labeled sections of memory circuits 101-1 to 101-4 (e.g., the CH0 sections of memory circuits 101-1 to 101-4) form a "channel" that operate under control of a channel controller residing in logic or control circuit 103. In the embodiment shown in FIGS. 1(a) and 1(b), within each channel, data and commands may be communicated among memory circuits 101-1 to 101-4 and logic or control circuit 103 through-silicon vias ("TSVs") and conductors formed using waferor die-bonding, or hybrid bonding, between adjacent surfaces of the semiconductor dies, as known to those of ordinary skill in the art.

FIGS. 1(a) and 1(b) are provided merely to illustrate an example of a circuit environment suitable for applying the present invention and thus should not be taken as limiting. For example, the number of channels shown in memory module 100 of FIGS. 1(a) and 1(b) can be any number determined by design choice in any given memory circuit. Any number of channels may be designed and configured in a memory module based on the needs of its application. Similarly, memory circuits 101-1 to 101-4 may each have formed therein memory arrays of any suitable number of memory cells. For example, in the embodiment to be described below, a memory module (e.g., memory module 200 of FIG. 2(a)) may include, again for illustrative purpose only, four memory circuits divided into 16 channels, with each memory circuit including memory arrays capable of providing 128 GB ($2^{40}$ bits) of data storage. In other embodiments, memory circuits 101-1 to 101-4 need not be stacked in a 3-dimensional configuration; in some embodiments, circuits 101-1 to 101-4 and control circuit 101 may be placed in a "flip chip" fashion on an interposer substrate and interconnected by conductor networks formed in the interposer substrate.

In one embodiment, the memory arrays may be any of the QV memory types (e.g., any type of electric charge-trapping thin-film storage transistors and any type of ferroelectric thin-film storage transistors). Electric charge-trapping thin-film storage transistors may include, for example, silicon-based thin-film storage transistors with silicon oxide-silicon nitride-silicon oxide (ONO) or silicon oxide-(zirconium oxide-silicon nitride-silicon oxide-aluminum oxide (OZNOA) storage layers. Ferroelectric thin-film storage transistors may include, for example, junction-ed or junction-less storage transistors with a ferroelectric storage layer (e.g., a ferroelectric hafnium zirconium oxide). An example of a junction-ed storage transistor is a conventional polysilicon MOS field-effect transistor. An example of a junction-less transistor includes an MOS field-effect transistor with an oxide semiconductor channel (e.g., indium gallium zirconium oxide (IGZO) channel).

The endurance of storage transistors for the embodiments described herein is each expected to be at least in the order of $2^{11}$ write/erase operations. In addition, in some memory types, the time required for a write operation in a storage transistor may be significantly longer than that required for its read operation. In the embodiments described herein, merely for illustrative purpose, a write operation is assumed to require a significantly longer time than a read operation. It should be understood, however, that such a read-write operation time asymmetry is not necessary for any device suitable to practice the patent invention, In one embodiment, the memory arrays may be implemented as regular building blocks ("tiles") formed on the semiconductor die. Various examples of such memory arrays may be found, for example, in Provisional Application II, in which thin-film ferroelectric storage transistors organized into an array of NOR memory strings are described. In one embodiment, the memory cells of each memory circuit are logically organized, hierarchically, as word lines (e.g., a grouping of pages within a bank), pages (e.g., 512-bit, 1 k-bit, or 2 k-bit units), and banks (e.g., 128-page or 256-page units). In one embodiment, each memory circuit is organized into multiple (e.g., 16) concurrently accessible portions. Together with other corresponding concurrently accessible portions on other memory circuits (e.g., one such portion per memory circuit), the independently accessible portions may be organized into a "channel," which is to be controlled by a channel controller. In this detailed description, for illustrative purpose only, a read or write command may encompass a cache line (e.g., 64 bytes of data).

Figure 2A:
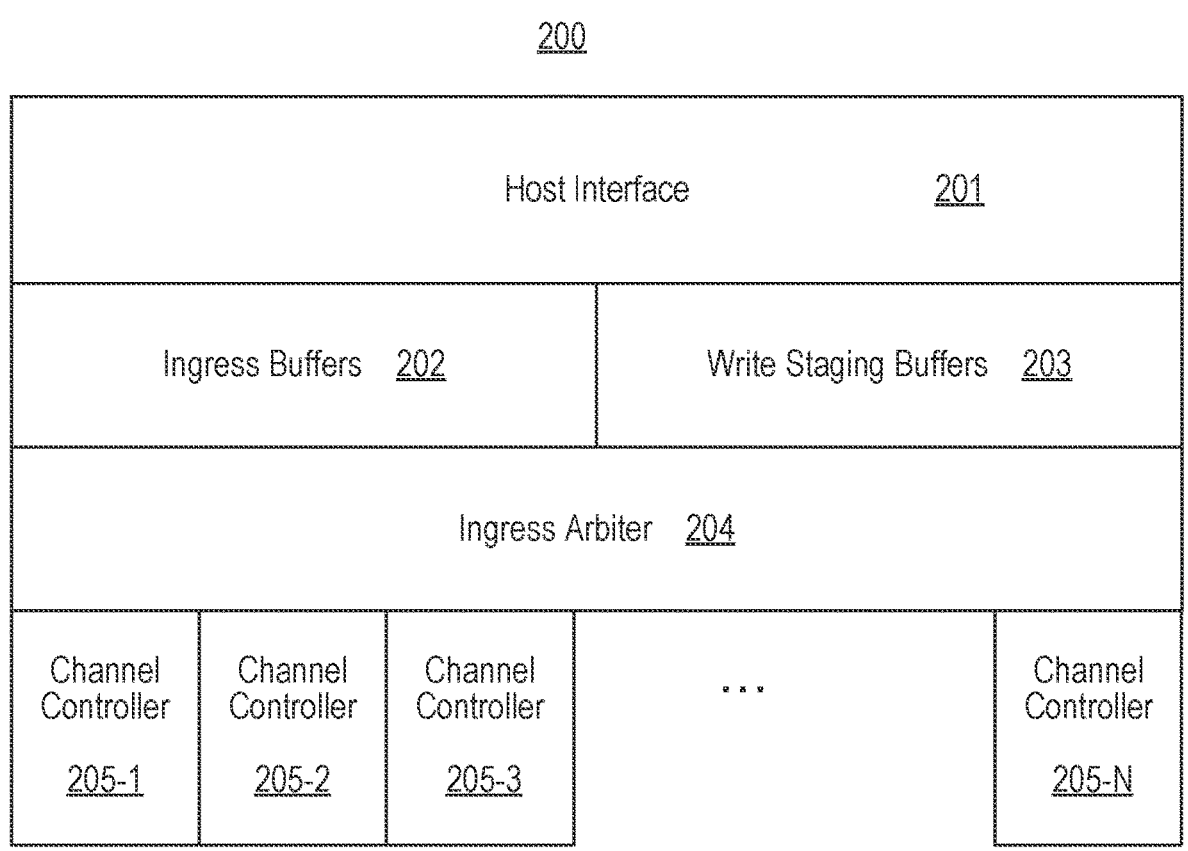
FIG. 2(a) illustrates control circuit 200 formed in a memory module, which may be used as one implementation of logic or control circuit 103 in memory module 100 of FIG. 1, in accordance with one embodiment of the present invention.

FIG. 2(a) illustrates control circuit 200 formed in a memory module of the type illustrated by FIGS. 1(a) and 1(b). In that regard, control circuit 200 may be used, for example, as one implementation of logic or control circuit 103 in memory module 100, in accordance with one embodiment of the present invention. As shown in FIG. 2(a), control circuit 200 includes host interface 201, which communicates with one or more central processing units (CPUs), each of which (not shown) may be a multi-thread general-purpose microprocessor or graphics processor, as known to those of ordinary skill in the art. Host interface 201 may be a conventional industry standard host interface (e.g., DDR5, or CXL). Memory access requests may be presented to control circuit 200 on one or more host data buses as host read or write requests, specifying one or more host-level logical addresses in a host address space. In one embodiment, a write request may be a "partial-write" request, which is a write request for writing less than the full extent of a cache line (e.g., writing 16 bytes in a 64-byte cache line).

When host interface 201 recognizes a host read or write request that specifies an address in the host address space that is mapped to memory module 200, the read or write request is captured into ingress buffers 202, which may include a queue for host read requests ("read ingress queue") and a queue for host write requests ("write ingress queue").

Control circuit 200 includes ingress arbiter 204, which examines the read ingress queue and the write ingress queue to select the read requests and write requests that are ready for dispatch to a channel controller for memory access. Ingress arbiter 204 also maps the logical addresses in the host memory space to addresses operated in memory module 200, or "device memory space." Unless explicitly provided, references herein to memory addresses refer to memory addresses in the device memory space. Write requests that are ready are acknowledged to the host and moved to write staging buffers (WSBs) 203. In one embodiment, because write latency can be substantially longer than read latency, a read request that is ready may sometimes be seeking data that is associated with an earlier, acknowledged write request that has not been dispatched to the respective channel controller or completed. In that case, the read request may be satisfied from the earlier write request that is still resident in WSBs 203. In some embodiments, the read request specifying an address of an acknowledged in WSBs 203 may trigger the write request to be dispatched to a write queue in the corresponding channel controller handling the write operation.

As mentioned above, ingress arbiter 204 maps memory addresses in the host address space to memory addresses in the device address space specific to memory module 200. In one embodiment, address napping to the address in device address space may be carried out by hashing the memory address in the host address space, followed by a modification, if required, according to the wear-leveling scheme (described below) and any other applicable re-mapping (e.g., redundancy scheme) implemented in memory module 200.

From the ready read requests in the read ingress queue and the ready write requests in WSBs 203, ingress arbiter 204 selects one request for dispatch to each channel controller during each local clock cycle (i.e., the clock cycles governing device operations within memory module 200, as distinguished from the host clock cycle in the host memory buses handled by host interface 201). In one embodiment, ingress arbiter 204 dispatches the read requests or write requests based on an empirical or predetermined priority ratio (e.g., 2-to-1 in favor of read requests). Prior to moving a request from the read ingress queue or the WSBs into a channel, a physical address that is mapped to a memory circuit in memory module 200 is obtained from a look-up table using the post-adjustment memory address in the device address space.

As shown in FIG. 2(a), the memory circuits in memory module 200 are divided into a number (N) of channels, each managed by a channel controller (i.e., channel controllers 205-1, 205-2, . . . , and 205-N. In one embodiment, the number of channels may be 16. Each channel controller manages the execution in the memory circuits of the read and write requests dispatched to it and any necessary maintenance operations (e.g., refresh operations) to be carried out.

Figure 3A:
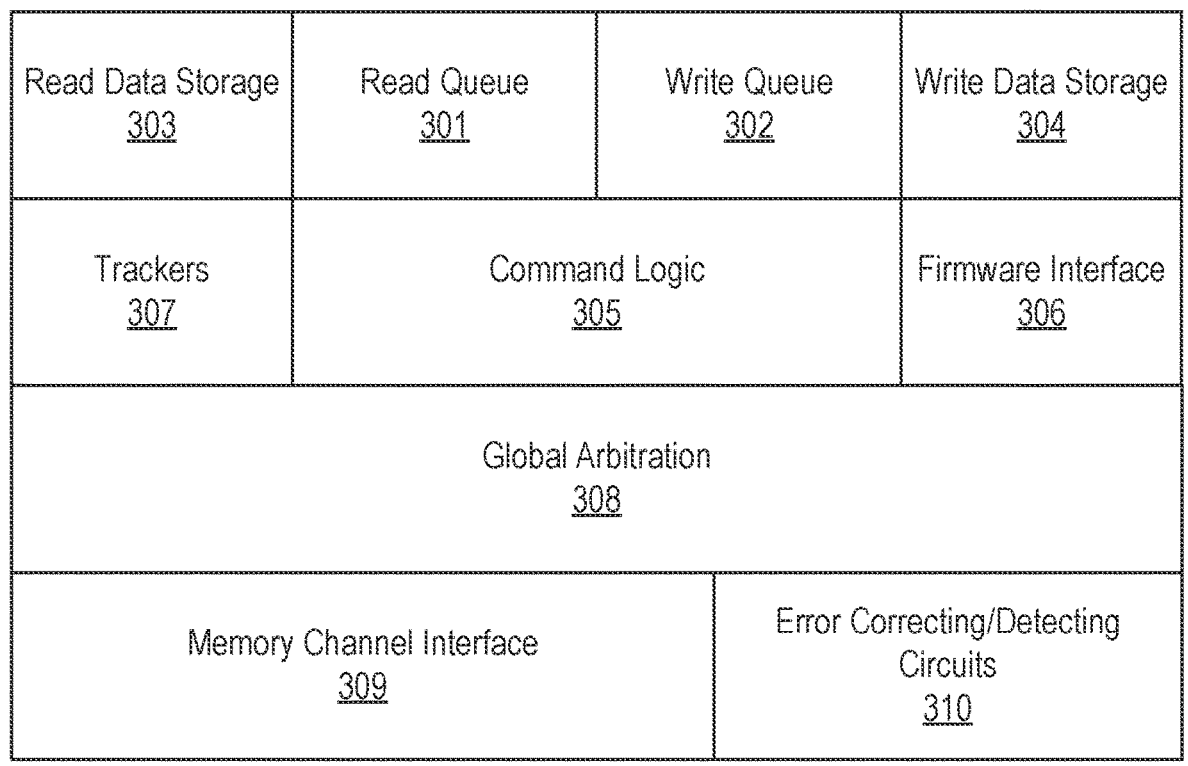
FIG. 3(a) illustrates an implementation of a channel controller (e.g., any of channel controllers 205-1, 205-2, . . . , and 205-N) in control circuit 200 of FIG. 2(a), in accordance with one embodiment of the present invention.

FIG. 3(a) illustrates an implementation of channel controller 300 (e.g., any of channel controllers 205-1, 205-2, . . . , and 205-N) in control circuit 200 of FIG. 2(a), in accordance with one embodiment of the present invention. As shown in FIG. 3(a), read and write requests dispatched to channel controller 300 are stored in read queue 301 and write queue 302, respectively. For a write request in write queue 302, the data to be written into the memory circuits is kept in write data storage 304 until the write request is fully committed. Tracker circuits 306 keep track of the status of each read or write request dispatched into channel controller 300. For a read request, data received back from the memory circuits is received into read data storage 303, until the read request is retired, and the data is returned to host interface 201 for communicating to the requesting host device.

Each read or write request is sent as a command to the memory circuits within the channel. Control logic circuits 305 manage the operations of the channel's commands, while they are carried out in the memory circuits. For example, in one embodiment, command logic circuits 305 may interrupt an ongoing write operation for a write request that it has initiated in favor of a read request, completing the interrupted write operation at a later time. (Such interruption of operations is disclosed, for example, in Provisional Application III.) In addition, command logic circuits 305 also manage various operations of commands that are required for periodic execution and for maintenance (e.g., refresh operations). At each clock cycle, global arbiter circuits 308 select and dispatch an operation to be initiated in the memory circuits over memory-channel interface 309. For data associated with a write request, error correcting/detecting circuits 310 compute, under an error correction coding (ECC) scheme, parity bits that are to be written with the data into the memory circuits. For a read request, error correcting/detecting circuits 310 compute, under the same ECC scheme, parity bits based on the data returned from the memory circuits and check them against the parity bits returned with the data.

Figure 2B:
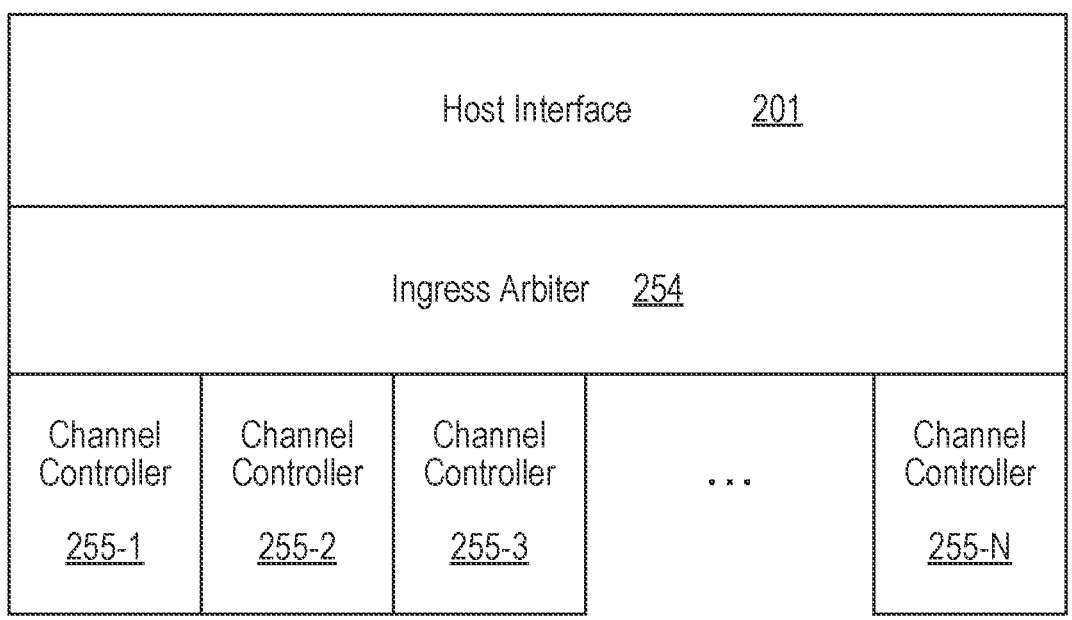
FIG. 2(b) illustrates control circuit 250 formed in a memory module, which may be used as another implementation of logic or control circuit 103 in memory module 100 of FIG. 1, in accordance with one embodiment of the present invention.
Figure 3B:
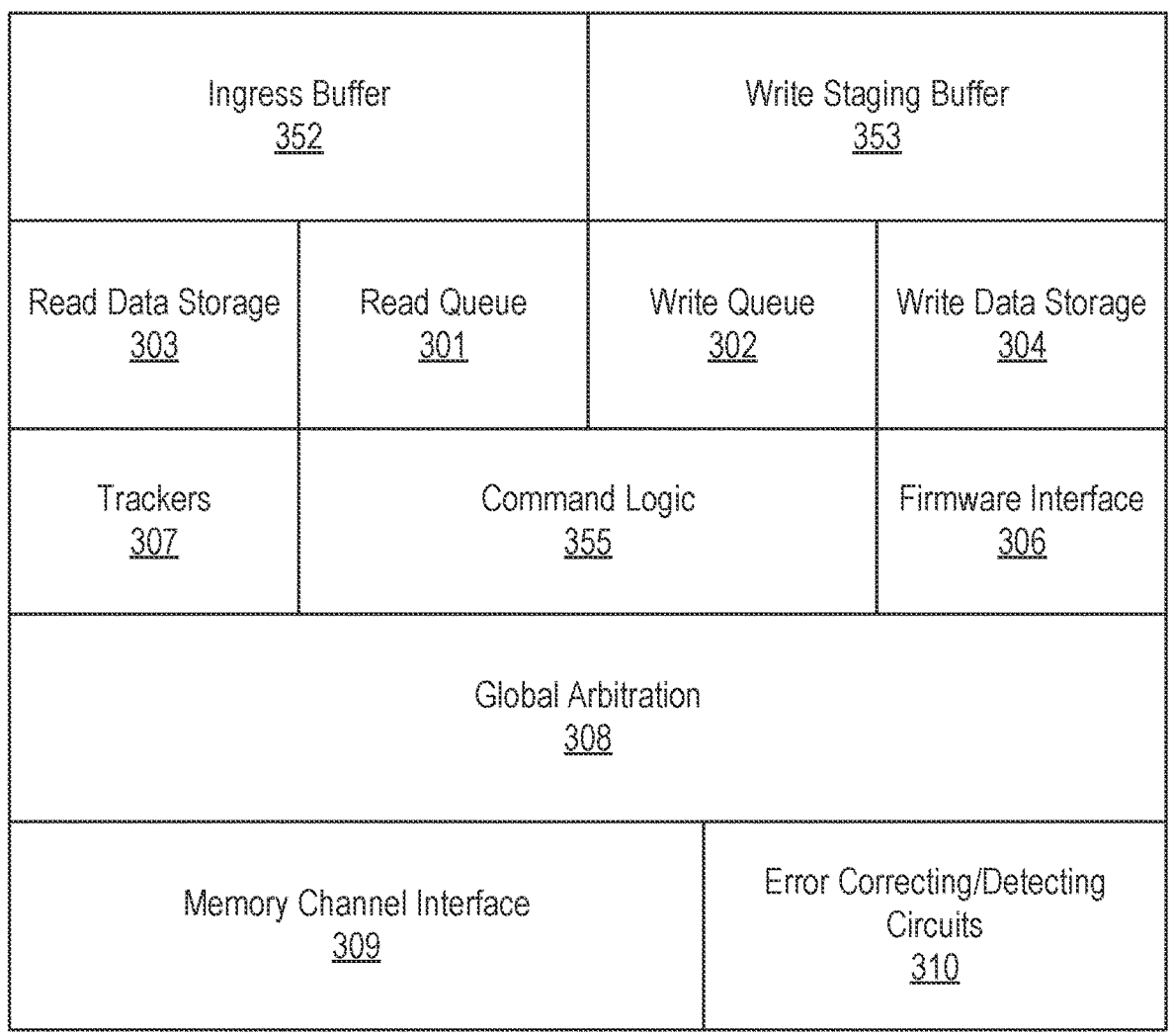
FIG. 3(b) illustrates an implementation of a channel controller (e.g., any of channel controllers 255-1, 255-2, . . . , and 255-N) in control circuit 250 of FIG. 2(b), in accordance with one embodiment of the present invention.

In some embodiments, each channel is associated with channel-specific ingress buffers and channel-specific write staging buffers. For these embodiments, FIG. 2(b) illustrates control circuit 250 formed in a memory module, which may be used as an implementation of logic or control circuit 103 in memory module 100 of FIG. 1. FIG. 3(b) illustrates an implementation of a channel controller (e.g., any of channel controllers 255-1, 255-2, . . . , and 255-N) in control circuit 250 of FIG. 2(b). As shown in FIG. 2(b), global ingress buffers 202 and global write staging buffers 203 are not provided. Instead, as shown in FIG. 3(b), in each channel controller (i.e., any of channel controllers 255-1, 255-2, . . . , and 255-N), channel-specific ingress buffers 352 and channel-specific write staging buffers 353 are provide. In those embodiments, when host interface 201 recognizes a host read or write request that specifies an address in the host address space that is mapped to memory module 200, ingress arbiter 254 route the received read or write request directly into ingress buffers 352 associated with one of channel controllers 205-1, 205-2, . . . , and 205-N.

Ingress buffers 352 may include its channel-specific read ingress queue and its channel-specific write request queue. Write data associated with an acknowledged write request may be stored in channel-specific write staging buffers 353.

In any embodiment of FIGS. 3(a) and 3(b), operations of channel controller 300 may be programmable over firmware interface 306.

FIGS. 4(a)-4(f) illustrate an implementation of a wear-leveling scheme according to one embodiment of the present invention. FIG. 4(a) shows, for illustrative purpose, a 16-page wear-leveling pool in which sixteen memory page addresses in the device address space—each page address having a word line field, a bank field, and a page field—are mapped to sixteen physical memory pages. In this description, a page address is represented by the tuple (word line, page, bank) formed by concatenating the corresponding fields. To access data in a memory page, its page address is resolved to the physical address of the physical memory page, which is then provided to the memory circuits. For example, as shown in FIG. 4(a), physical memory pages A-P are initially mapped to page addresses (0, 0, 0) to (1, 1, 3), respectively. Under the wear-leveling scheme of the present invention, each page address is re-mapped at different times to different physical memory pages, so that write operations to each page address are distributed to the different physical memory pages associated with it.

FIGS. 4(a)-4(f) show respective current mappings of physical memory pages A-P at various time points under the wear-leveling scheme according to one embodiment of the present invention. The initial mappings between page addresses to physical memory pages A-P are also shown in each figure for reference and to facilitate this detailed description. The 16-page wear-leveling pool is associated with a special physical memory page ("spare page SP") initially mapped to a special page address ("spare address <spare>"). Spare page SP need not be implemented by a physical memory page in the memory circuits. In fact, in some embodiments, a special storage buffer ("holding page"), associated with spare address <spare> is provided in the channel controller. This holding page is initially designated spare page SP and holds the content of a designated memory page during each "replacement cycle" (defined below). With this arrangement, a physical memory page is not required for spare page SP. In an embodiment illustrated by either FIG. 3(a) or FIG. 3(b), for example, the holding page may be implemented as a special entry in write data storage 304.

At any given time, the data of a memory page may be found in either the holding page or one of the physical memory pages in the wear-leveling pool. In one embodiment, spare address <spare> is one page address offset greater than the greatest page address among the page addresses of the wear-leveling pool. (The page address offset is the numerical difference between contiguous page addresses.) In each wear-leveling pool, spare address <spare> may reside in the channel controller. For example, in one embodiment, the write queue in each channel controller allocates an entry (i.e., the holding page) to each wear-leveling pool in the channel.

In a practical implementation, the number of physical memory pages in a wear-leveling pool is much larger. For example, in one embodiment, in each memory circuit the page address is specified, for example, by 28 bits, to allow specification of up to 512 banks (i.e., a 9-bit bank address), up to 8192 word-lines (i.e., a 13-bit word-line address) in each bank, and up to 64 pages (i.e., a 6-bit page address) within each word line. Divided into 16 channels, each wear-leveling pool may be specified by 24 bits. In FIG. 4(a), for illustrative purposes, the page address in the 16-page wear-leveling pool is shown being specified by the combination of a 1-bit word line field, a 1-bit page field, and a 2-bit bank field. The bank field identifies a physical memory bank in the memory circuit, the word line field identifies a group of physical memory pages within the bank identified by the bank field, and the page field identifies a physical memory page within the group identified by the value in the word line field.

Memory circuits are typically also organized physically as banks, word lines and pages. In the example of either FIG. 3(a) or FIG. 3(b), the memory circuits may further be organized as dies and channels. In a straight-forward implementation, the bank field, the word line field, and the page field can be hierarchically decoded (i.e., decoding the bank field does not depend on the values of the word line and the page fields, and decoding the word line field does not depend on the value of the page field). In other implementations, decoding of the page address need not be hierarchical.

The wear-leveling scheme periodically carries out a "migration" operation. The migration operation involves (i) the page address currently mapped to spare page SP ("target address"), and (ii) a second page address within the wear-leveling pool ("source address"). In a general implementation, at the migration, the content of the physical memory page ("source page") associated with the source address ("migrating data") is read out into a holding buffer and then written into spare page SP. Thereafter, the source address is mapped to spare page SP, and the target address is mapped to the source page. In this detailed description, by design choice, the source address is selected to be at the page address that is one page address offset immediately preceding the target address. Of course, the choice of the source address may be any page address that can be algorithmically determined. For example, one may choose by convention, alternatively, the source address to be the page address that is one page address offset immediately following the source address. The goal of the wear-leveling scheme is to distribute all write requests evenly over all physical memory pages. The algorithm for choosing the source address should preferably contribute to achieving this goal. In this detailed description, the time period during which each memory page in a wear-leveling pool has undergone at least one migration is referred to as a "replacement cycle."

In one implementation suitable for a multi-die memory module, all physical memory pages of each wear-leveling pool are provided on one memory circuit (i.e., memory arrays formed on one semiconductor die). In that implementation, for a memory module with four memory circuits, for example, at least four wear-leveling pools may be shared among the channels. In another embodiment, each wear-leveling pool is specific to a particular die and a specific channel.

Each migration requires moving the migrating data from the source page to spare page SP and the source page is redesignated spare page SP. The migration is managed by a finite state machine (FSM) in command logic circuits 305, for example. The migration involves (i) a "read" phase, in which the migrating data is read from the source page, and (ii) a "write phase" in which the migrating data is written into spare page SP. In one embodiment, by implementing a holding page in the channel controller—the initially designated spare page SP—each migration requires only a single write operation to the memory circuits.

In one embodiment, where the channel controller handles multiple wear-leveling pools (e.g., one or more wear-leveling pools in each memory circuit of the multi-die memory module), each wear-leveling pool may be provided s separate FSM. Thus, it may be possible that multiple migrations may be carried out in parallel. A migration arbitration circuit may be provided to limit resource conflicts. A resource conflict may arise, for example, when more than one migration FSMs may require access to a shared look-up table to obtain page address-to-physical address translation, or to access shared write data storage 304. Alternatively, to reduce resource conflicts, only one migration is allowed to be carried out at any given time. In that embodiment, a round-robin system may govern the order of migrations among the various wear-leveling pools.

In one embodiment, each memory pool encompasses only physical memory pages in a single memory circuit, thus avoiding cross-memory circuit migrations, which may create congestion at scarce resources (e.g., memory-channel interface 309).

When a read request to the migration data arrives during the read phase of the migration, the read request may be held until the read phase completes and may be then serviced from the data returned from the read phase operation (e.g., from a holding buffer for results from read requests).

When a read request seeking the migrating data occurs during the write phase, the re-designation of the migrating data would have taken place, and the physical memory page associated with the address specified in the read request is resolved to physical memory page that is designated spare page SP previous to the migration. During each replacement cycle, a designated memory page resides in the holding page for the wear-leveling pool. Read and write accesses to the designated memory page may be serviced from the holding page. Thus, in one embodiment, a read request may be serviced from write data storage 304 where the holding page resides.

Alternatively, the physical memory pages in a wear-leveling pool may encompass multiple memory circuits. In an implementation where the wear-leveling pool spans multiple memory circuits, each page address in the wear-leveling pool includes a memory circuit or die field, which may be specified as additional address bits, or which may already be embedded in the bank field (i.e., each bank encompasses physical pages in multiple memory circuits).

FIG. 4(b) shows the state of the wear-leveling pool resulting from the first migration, after a triggering event, form the state of the wear-leveling pool of FIG. 4(a). In one embodiment, a triggering event occurs when a predetermined number of write requests in the wear-leveling pool have been carried out after initialization or since the last migration. In this migration operation, (i) the target address is spare address <spare>—in this instance, spare page SP resides in the holding page—and (ii) the source address is page address (1, 1, 3), associated with physical memory page P, where the migrating data resides. During the migration, the migrating data in physical memory page P is copied into the physical memory page (i.e., the holding page) which at this time is designated spare page SP. After migration, spare page SP is redesignated to be associated with page address (1, 1, 3) until the next migration. Write and read requests specifying page address (1, 1, 3) are now serviced from the holding page until the next replacement cycle, rather than the physical memory page P.

FIG. 4(c) illustrates the state of wear-leveling pool resulting from the next migration following the state of the wear-leveling pool in FIG. 4(b), which occurs at the next triggering event. In this next migration, the target address is page address (1, 1, 3), the source address is page address (1, 1, 2), and the migrating data migrates from physical memory page O, which is the source page. In this migration, the migrating data moves from the source page to spare page SP. The source page (i.e., physical memory page O) and spare page SP are then respectively redesignated to be associated with the target address (i.e., page address (1, 1, 3)) and the source address (i.e., page address (1, 1, 2)). After the migration and for the remainder of this replacement cycle, read or write requests to the page address (1, 1, 2) accesses physical memory page O. During the remainder of this replacement cycle, spare address <spare> remains associated with the memory page originally associated with physical memory page P. Note that, however, under the wear-leveling scheme of FIGS. 4(a)-4(f), at any given time, no read or write requests will be resolved to current spare page SP.

Under the wear-leveling scheme of the present invention, a migration is repeated after each occurrence of a recurring triggering event (e.g., expiration of a timer, or over-flow or under-flow of a counter ("write counter"), such as one that over-flows or under-flows upon the completion of a predetermined number of write requests in the wear-leveling pool). At each migration, (i) the migrating data is copied into spare page SP, and (ii) the source and the target addresses are re-mapped to spare page SP and the physical memory page from which the migrating data migrated, respectively. In one embodiment, discussed further below, a look-up table resolves the page address to the physical page address of the associated physical memory page.

FIG. 4(d) shows the resulting state of the wear-leveling pool, after 14 migrations following the state of FIG. 4(c). In FIG. 4(d), page address (0, 0, 0)—initially mapped to physical memory page A—is mapped at this time to spare page SP. At this time, page addresses (0, 0, 0) to (1, 1, 3) in the wear-leveling pool each have been re-mapped from their initial respective mappings to physical memory pages A-P. In fact, each physical memory page is now associated with the page address obtained by adding one page address offset to the page address it is initially associated with. For example, physical memory page D—which is initially associated with page address (0. 0, 3)—is now associated with page address (0, 1, 0), which is obtained by adding one page address offset to page address (0, 0, 3). Spare address <spare> remains associated with memory page initially associated with physical memory page P.

Note that, in one embodiment according to the channel controller of FIG. 3(a) or FIG. 3(b), where the holding page is implemented in write data storage 304, the designated memory page being held in the holding page can be treated as part of a write request pending in the write queue to be released to complete a write operation at a physical memory page in a memory circuit in the channel. Until the beginning of the next current replacement cycle, that write request is not released, such that read or write operations to the designated memory page are satisfied from write data storage 304. At the beginning of each replacement cycle, a migration results in the release of the write request corresponding to the previous designated memory page, replaced by the new write request for new designated memory page that is to be held throughout this new replacement cycle. The migrating data corresponding to the new designated memory page, which resides in read data storage 303 during the read phase of the migration, is forwarded to write data storage 304 during the write phase. The new write request corresponding to the new designated memory page is held until the next migration.

FIG. 4(e) shows the state of the wear-leveling pool resulting from the next migration following the state of the wear-leveling pool in FIG. 4(d). In this next migration, the target address is page address (0, 0, 0), the source address is spare address <spare>, so that the source page is the holding page, which holds in this replacement cycle the memory page originally associated with physical memory P. The migrating data migrates from the holding page to return to physical memory P. Thus, as shown in FIG. 4(e), page address (0, 0, 0) is now mapped to physical memory page P and the holding page of spare address <spare> is once again designated spare page SP. Returning the mapping of spare page SP back to the holding page also represents that each of physical memory pages A-P have migrated once, marking the completion of the first replacement cycle. As shown in FIG. 4(e), physical memory pages A-P are each now associated with the page address obtained by adding a page address offset to the page address to the physical memory page it is initially associated with. In fact, every replacement cycle adds an additional address offset, so that the page address associated with a physical memory page is obtained by adding to the initial page address the page address offsets due to the number of full replacement cycles and a page address offset due to its own migration, if any, within the current replacement cycle.

FIG. 4(f) illustrates the state of the wear-leveling pool resulting from the next migration following the state of wear-leveling pool in FIG. 4(e). In this next migration, the target address is spare address <spare>, the source address is page address (1, 1, 3), and the migrating data migrates from physical memory page P. Thus, as shown in FIG. 4(f), page address (1, 1, 3) is now mapped to spare page SP, and spare address <spare> is mapped to physical memory page O. Thus, to access the data at page address (1, 1, 2), two page address-offsets are added to page address (1, 1, 2), one for the replacement cycle and one for the migration to the physical memory page corresponding to spare address <spare>.

The operations encompassed by FIGS. 4(b)-4(f) would repeat 15 more times to achieve a "complete rotation"—i.e., when the wear-leveling pool returns to the initial state of FIG. 4(a).

One parameter of the wear-leveling scheme is the frequency of the triggering event (e.g., after each predetermined number of write request completions between successive migrations). This frequency is preferably empirically determined to balance between (i) effectively spreading write requests evenly over all physical memory pages of the wear-leveling pool and (ii) the migration cost overhead. In one embodiment, for a system with an expected endurance of about $10^{11}$ write/erase cycles, the inventors estimate that a wear-leveling pool of 16M pages would achieve a complete rotation after $256*2^{40}$ migrations. Using 256 as the predetermined number of write cycles between successive migrations, the inventors has determined that, in about 23 complete rotations, an average of $10^{11}$ write/erase cycles would have occurred per physical memory page. In one embodiment, the inventors estimate that this result represents approximately a very commercially desirable 10 years of continuous operation.

Figure 6:
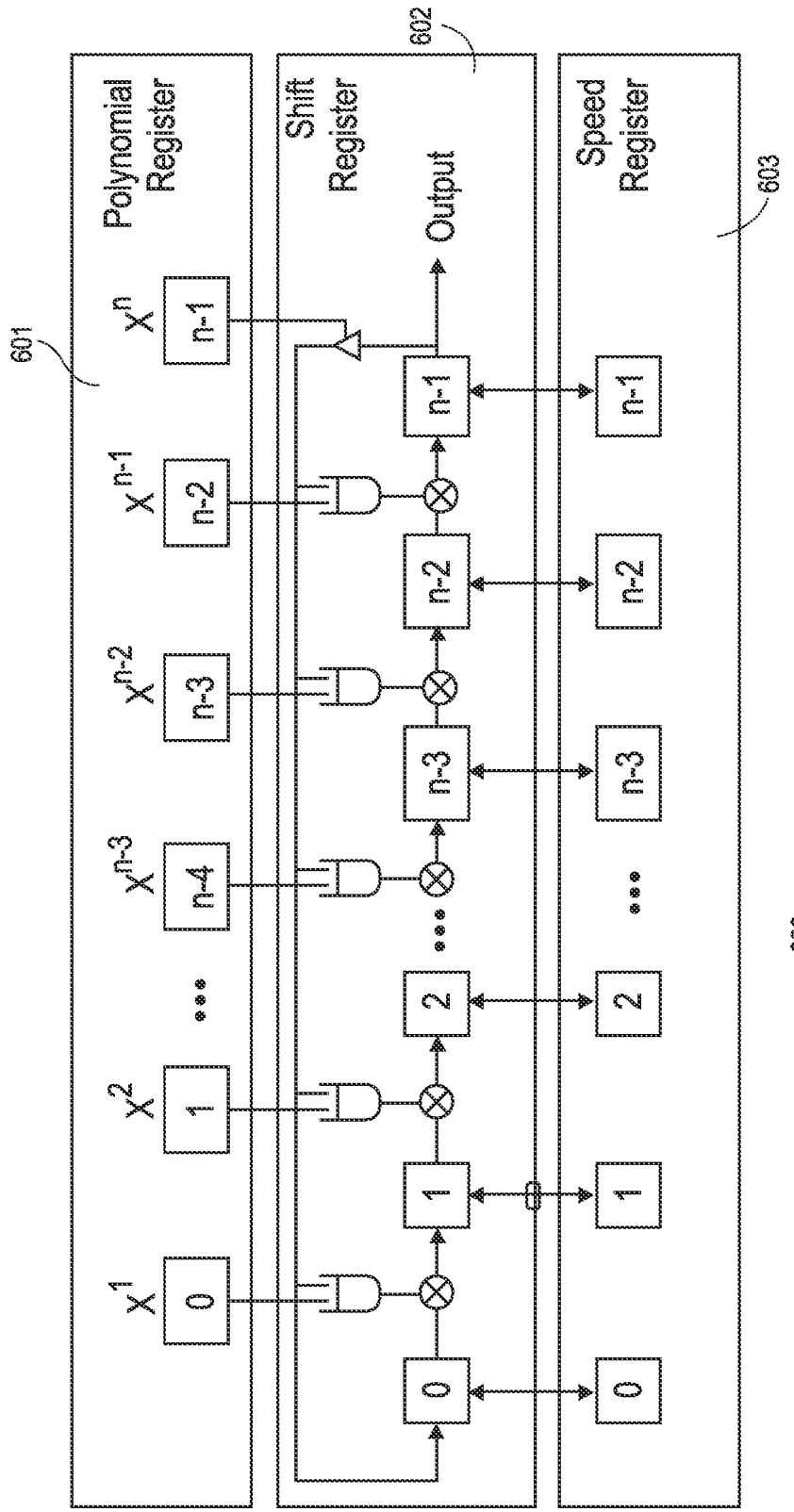
FIG. 6 shows an implementation of LFSR 600, according to one embodiment of the present invention.

Alternatively, a migration need not be triggered on a regular schedule, such as by a fixed number of completed write operations. Some variability or randomness in the migration trigger may forestall an attack by a malicious actor. In one embodiment, the migration may be triggered according to triggering events derived from a pseudorandom number generator, such as a linear feedback shift register (LFSR) known to those of ordinary skill in the art. An LFSR may be generated from a polynomial expression. For example, an LFSR based on a 16-degree polynomial and a non-trivial seed provides a pseudorandom bit-pattern that is repeated only after $2^{16}$ clock cycles. Thus, such an LFSR may be used to drive a replacement cycle of $2^{16}$ write operations. Within that replacement cycle, migrations may be triggered in a pseudorandom manner, with varying number of write requests completed between migrations. Greater or coarser granularity may be achieved using an LFSR of different lengths, or by cascading multiple LFSRs, as known to those skilled in the art. FIG. 6 shows an implementation of LFSR 600, according to one embodiment of the present invention. As shown in FIG. 6, LFSR 600 includes shift register 602, which receives feedback bits derived from the output bit of shift register 602 and coefficients of the polynomial, which are stored in register 601. Shift register 602 is initialized by a seed value held in seed register 603.

In another embodiment, memory module 200 practices a data integrity maintenance procedure—informally referred to as "scrubbing"—by which minor errors in the memory circuit are corrected. In scrubbing, the channel controller (i) reads the data of a physical page from the memory circuit; (ii) re-encodes the data using the ECC scheme, after performing any necessary data recovery; and (iii) returns the encoded data back to the physical page. A detailed description of the scrubbing process may be found, for example, in co-pending U.S. patent application ("Scrubbing Application"), Ser. No. 17/512,449, entitled "System and Method for Data Integrity in Memory Systems that include Quasi-Volatile Memory Circuits," now published as U.S. Patent Application Publication 2022/0148670 A1, filed on Oct. 27, 2021. The disclosure of the Scrubbing Application is hereby incorporated herein in its entirety. In one implementation, the scrubbing of a physical page is initiated in the channel controller periodically upon expiration of a timer ("scrubber timer").

The inventors observe that, in a migration under a wear-leveling scheme of the present invention, the channel controller performs substantially the same operations as a scrubbing procedure, except that in a migration operation, the data that is re-written into the physical page (i.e., the write phase) is taken from a different page (i.e., the source page). Accordingly, in that embodiment, a migration of a memory page within a wear-leveling pool may be combined with scrubbing of the physical page corresponding the same memory page.

To achieve this combined scrubbing and wear-leveling operation, the triggering event for a migration under the wear-leveling scheme is the expiration of the scrubber timer or the over-flow or under-flow of the write counter, whichever occurs earlier. In that embodiment, both the write counter and the scrubber timer are re-initialized asynchronously after the migration is initiated. The frequency of the triggering event may be set to allow the write counter to reset the scrubber timer occasionally. In one embodiment, in which the wear-leveling pool has 16M pages spread across 128 memory banks, a scrubber timer which expires every 5.15 milliseconds was paired with an 8-bit (i.e., 256 counts) write counter.

Figure 5A:
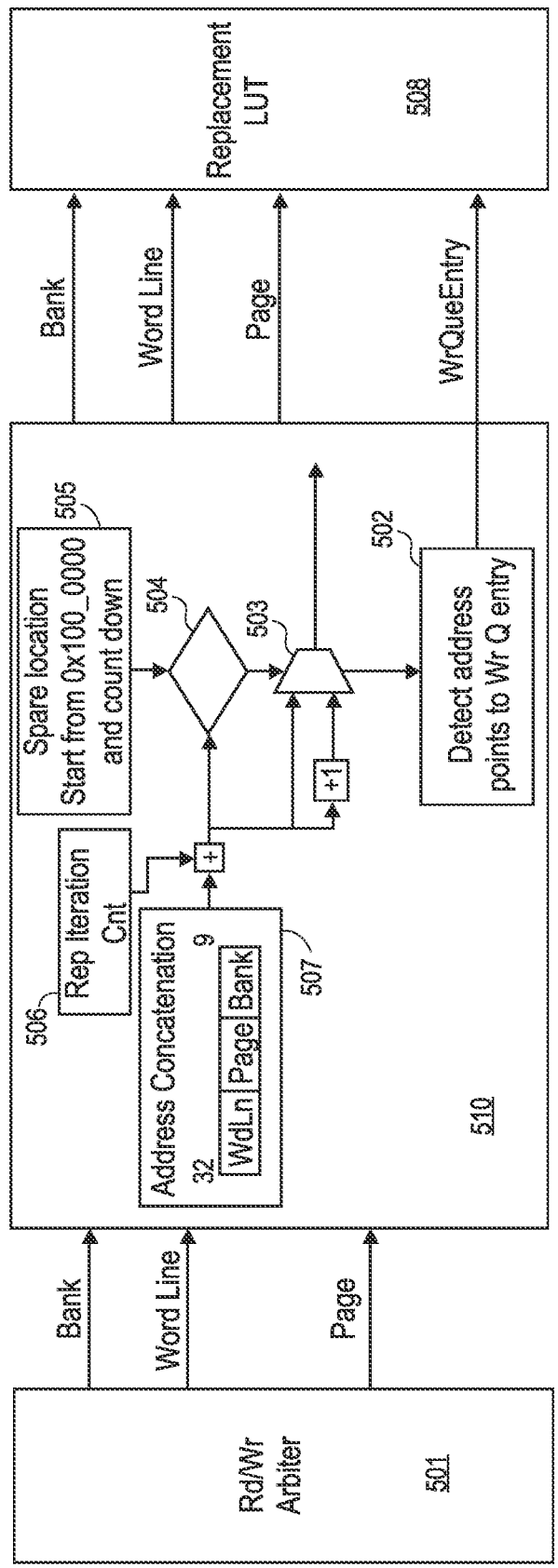
FIG. 5(a) is a functional block diagram illustrating the operations of address mapping circuit 500, according to one embodiment of the present invention.

FIG. 5(a) is a functional block diagram illustrating the operations of address mapping circuit 500, according to one embodiment of the present invention. As shown in FIG. 5(a), address mapping circuit 500 includes read/write arbiter circuit 501—which may be implemented in ingress arbiter 204 of FIG. 2(a) or ingress arbiter 254 of FIG. 2(b), for example—for selecting a read request or a write request from the ingress buffers. Read/write arbiter circuit 501 extracts an address in a host address space from the selected read or write request from a host and converts the address to a page address in the device address space (i.e., an address consisting of (word line, bank, page) fields discussed above, which is then received into request address register 507.

Address mapping circuit 500 also includes address adjustment circuit 510, which includes spare page tracking register 505, replacement cycle counter 506, and replacement look-up table (LUT) 508. Spare page tracking register 505 keeps tracks of the page address currently mapped to spare page SP. Initially, spare page tracking register 505 is initialized to 0x100 . . . 000, which is spare address <spare>. In this embodiment, spare address <spare> is one page address offset greater than the greatest of the page addresses in wear-leveling pool. Spare page tracking register 505 is decremented by one page address offset after each migration. At the completion of one replacement cycle, spare address <spare> returns to 0x100 . . . 000.

Replacement cycle counter 506 keeps track of the number of completed replacement cycles since initialization. In the embodiment shown in FIG. 5, replacement cycle counter 506 holds a value substantially equal to the product of the page address offset and the number of completed replacement cycles.

As shown in FIG. 5(a), the number of completed replacement cycles in replacement cycle counter 506 is summed with the page address in request address register 507 to provide the page address adjusted for replacement cycles. This adjusted page address is compared in comparison circuit 504 with the page address of spare page SP stored in spare page tracking register 505. If the adjusted page address is less than the page address of spare page SP, the adjusted page address is the final adjusted page address for use in address translation in replacement LUT 506 for the physical memory address used in memory access in the memory circuit. Otherwise, a further page address offset is added to the adjusted page address to obtain the final adjusted page address. The further page address offset accounts for a migration that is already completed with the current replacement cycle.

Replacement LUT 506 may be provided in a channel controller to allow custom configuration for that channel. Also shown in FIG. 5 is comparison circuit 502 which detects if the final adjusted page address matches the initial spare address—i.e., if the physical memory page to be accessed is spare page SP. In that case, comparison circuit 502 causes replacement LUT 506 to provide the physical memory address of spare page SP, if one exists. As mentioned above, spare page SP may be implemented by an entry in the write data storage in the channel controller. In that case (i.e., when the initial spare address is matched to the final adjusted page address), a physical memory address does not exist, and the read and write operations on spare page SP are handled entirely in the channel controller.

Note that, under the wear-leveling scheme illustrated by FIGS. 4(a)-4(f), together with a hierarchical decoding scheme of the page addresses, a malicious actor can continuously attack the same physical memory page within a good part of a complete rotation. For example, consider a malicious actor targeting page addresses (0,0,1), (0,0,2), (0,0,3) and (0,0,4). At the beginning of the first replacement cycle, the malicious actor would be issuing write requests that cause write operations in physical memory pages A, B, C and D. After the first replacement cycle, as shown in FIG. 4(f), only physical memory page D is outside of the malicious actor's attack on page addresses (0,0,1), (0,0,2), (0,0, 3) and (0,0,4). Physical memory page A remains vulnerable until after the $4^{th}$ replacement cycle. In a realistic implementation, in which the wear-leveling pool may be 32M pages (i.e., 25-bit page address), physical memory page A is vulnerable for a duration that spans greater than $10^{10}$ write operations, at a migration interval of 756 write operations. During this time, physical memory pages A, B, C and D would have endured significant reduction in remaining endurance.

Such a result may be avoided by the randomizing the selection of source address at each migration. One form of randomizing may be achieved by using a hashed page address in the wear-leveling scheme, rather than using the page address directly. The hashed page address may be obtained by applying a hashing function on the word line field, the page field, and the bank field.

According to one embodiment of the present invention, the hash function (i) performs a bit-wise exclusive-OR operation between the world line field and the page field with the bank field; and (ii) performs a bit-wise exclusive-OR operation between the result of the exclusive-OR operation of (i) with a selected seed value. For example, in one embodiment, the seed is assigned the value (1, 0, 2), so that page address (0, 0, 1) is modified to (0,1,1) after the bit-wise exclusive-OR operation of (i). The hashed page address becomes (1,1,3), after performing the bit-wise exclusive-OR operation between the modified page address (0, 1, 1) of (i) and seed value (1, 0, 2). FIG. 8 shows the result of applying this hash function to the example of FIGS. 4(a)-4(f), at the end of the first replacement cycle; namely, FIG. 8 shows the mapping among page addresses, hashed page addresses, initial mapping of physical memory pages, and the mapping of physical memory pages at the end of the first replacement cycle. FIG. 8 illustrates that the first 4 migrations—which involve source addresses (1, 1, 3), (1, 1, 2), (1. 1. 1) and (1, 1, 0)—physical memory pages B, E, L and O are selected, rather than physical memory pages P, O, N and M. Therefore, at the end of the first replacement cycle, physical memory pages A, C and D have been migrated away from being vulnerable to the malicious actor's attack on page addresses (0,0,1), (0,0,2), (0,0,3) and (0,0,4). No doubt, these physical pages would return to and migrate out of vulnerability in subsequent replacement cycle. The net effect of the hash function, however, is the more uniform distribution of write operations among the physical memory pages, thereby avoiding certain physical memory pages to be subject to extensive premature reduction in endurance.

Further enhancements to the hash function may be achieved by reordering the fields in the page address, the bits in one or more fields in the page address, or both. In a page address that includes also a die field, a channel field, or both, these fields may be provided non-hierarchical positions in the page address and may also participate in the hash function. In some embodiments, each wear-leveling pool may be assigned different seed values to protect against write operations that are non-uniformly distributed in the page address space, whether the source is malicious or not.

Figure 5B:
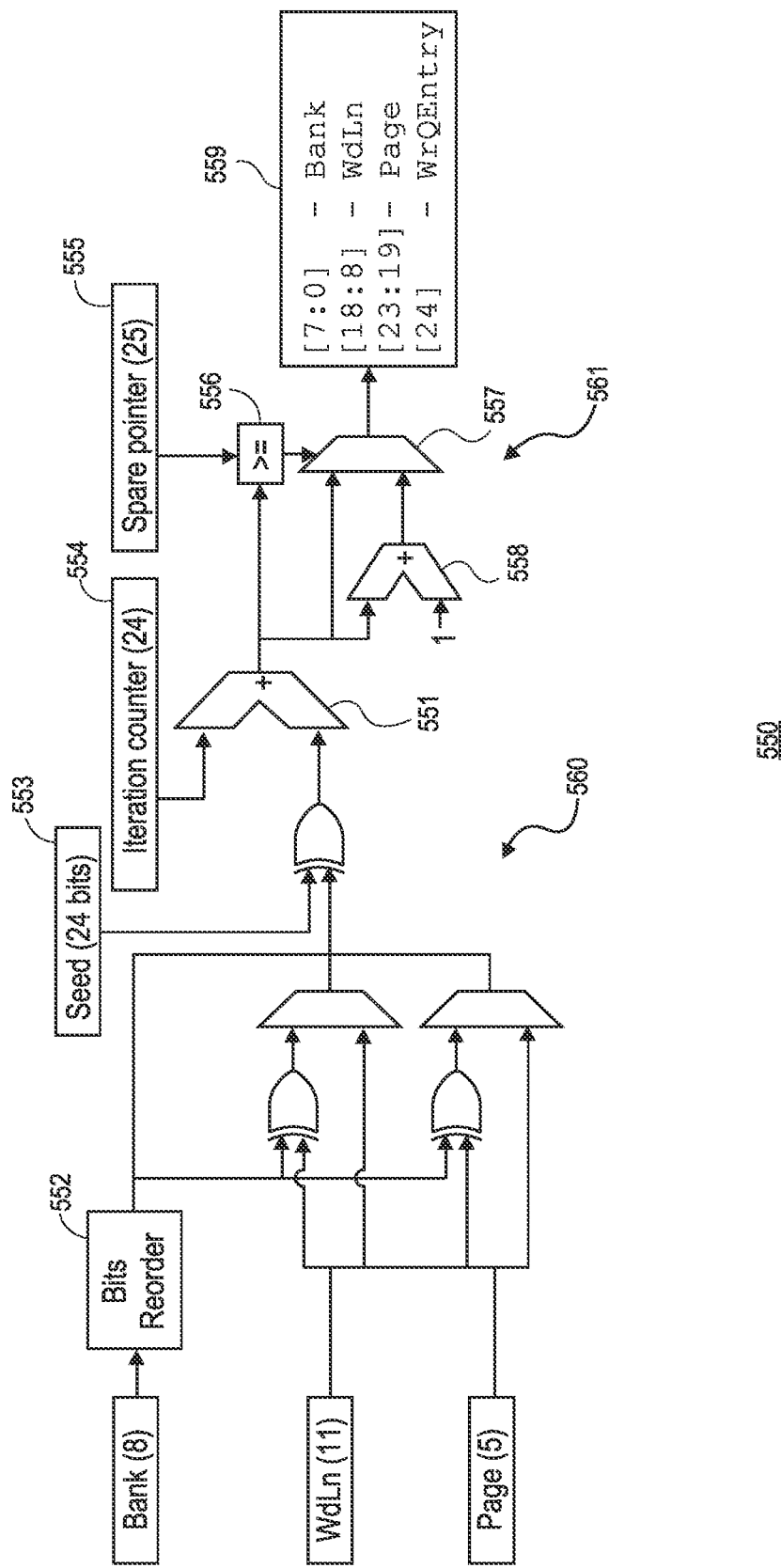
FIG. 5(b) shows address adjustment circuit 550 that performs address adjustment under both an address hashing scheme and the wear-leveling scheme of FIGS. 4(a)-4(f), according to one embodiment of the present invention.

FIG. 5(b) shows address adjustment circuit 550 that performs address adjustment under both an address hashing scheme and the wear-leveling scheme of FIGS. 4(a)-4(f), according to one embodiment of the present invention. As shown in FIG. 5(b), a page address includes 8-bit bank field, an 11-bit word line field, a 5-bit page field. Bits reordering circuit 552 first reorders the bits in the bank field. Seed register holds a programmable 24-bit seed. In hashing circuit 560, a 24-bit first result is obtained by performing bit-wise exclusive-OR on selective bits of the word line field and the page field with some of the reordered bits of the bank field. Further scrambling in hashing circuit 560 provides a hashed 24-bit page address; the hashed address is achieved by performing bit-wise exclusive-OR operations between the 24-bit seed and the 24-bit first result. The hashed address can then be provided as input to migration-tracked address adjustment circuit 561 to provide the final adjusted page address to look-up the physical memory address for a physical memory page in wear-leveling pool. Migration-tracked address adjustment circuit 561 may be implemented in substantially the same manner as address adjustment 510 of FIG. 5(a). As shown in FIG. 5(b), adder 551 adjusts the hashed address using the replacement cycle count in replacement cycle counter 554. Comparator 556 determines whether or not the replacement cycle-adjusted hashed address is greater than the current address associated with spare page SP—stored in spare page tracking register 555— to determine whether the final adjusted page address should be further adjusted for migration in the current replacement cycle. This final page address is submitted to a look-up table (e.g., LUT 506 of FIG. 5(a)) to obtain the physical memory address for the physical memory page in the memory circuit.

Figure 7:
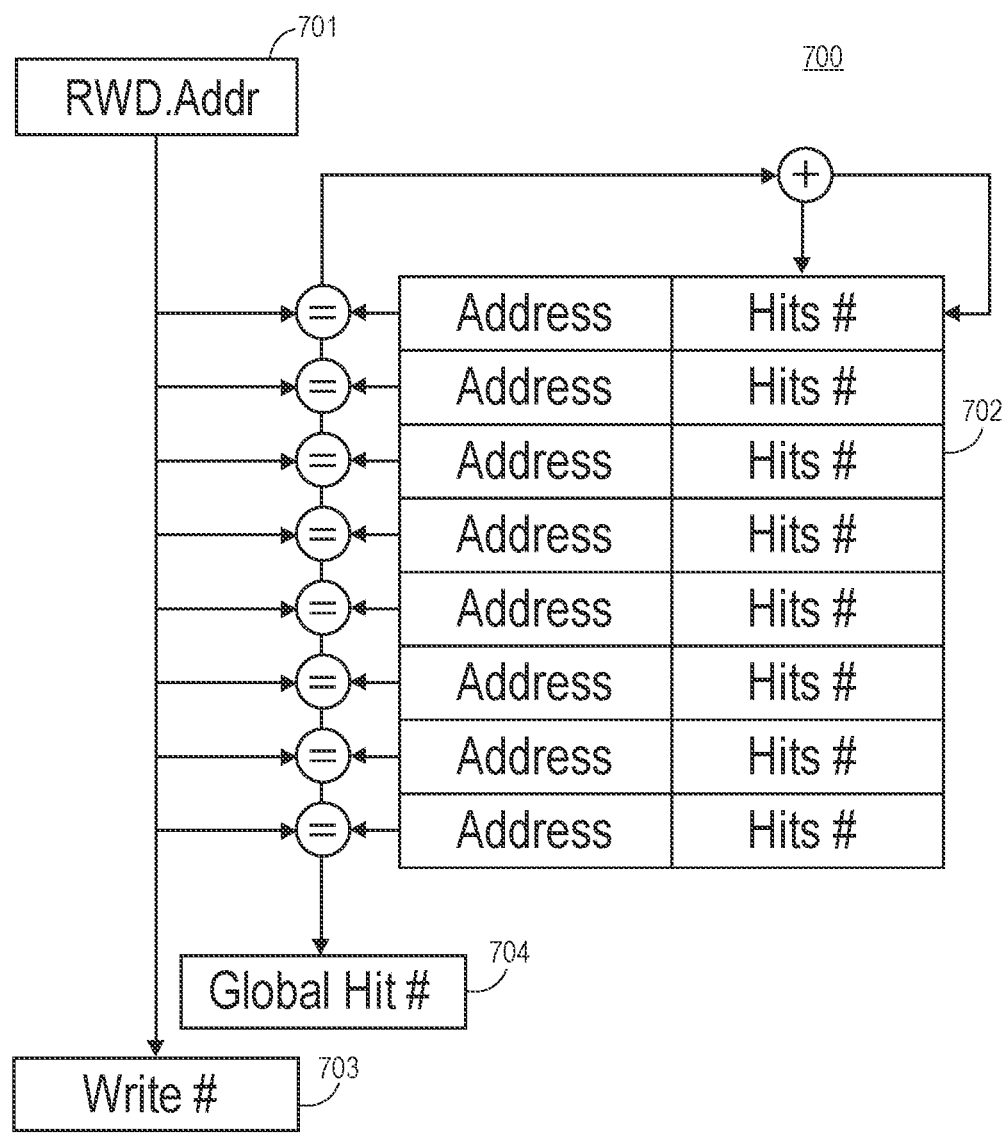
FIG. 7 shows detector 700 of high write frequencies for selected page addresses, in accordance with one embodiment of the present invention.

An adaptive wear-leveling scheme may also be applied. In an adaptive wear-leveling scheme, the triggering frequency (i.e., the replacement rate) may be adjusted when an unusually high frequency of write operations are detected for certain page addresses. FIG. 7 shows detector 700 of high write frequencies for selected page addresses, in accordance with one embodiment of the present invention. As shown in FIG. 7, detector 700 includes table 702, monitored page address register 701, monitored write counter 703, and global "hits" counter 704. Table 702 includes a list of monitored page addresses and a "hits" field recording their respective "hits" detected (i.e., the number of write operations detected for the associated monitored page address). At each monitored write operation, the target page address of the monitored write operation is captured into monitored write address register 701 and is compared to each of the monitored page addresses in table 702. Concurrently, monitored write counter 703 is incremented. When one of the monitored page addresses in table 702 matches the page address captured in monitored write address register 701, both global hits counter 704 and the "hits" field associated with the matched monitored page address are also incremented.

Table 702 may be implemented by a content-addressable memory circuit for efficiency in the detection operation. FIG. 7 shows only 8 entries in table 702 merely for the purpose of illustration. Table 702 may be any size, but typically, for purpose of power and circuit overhead resource concerns, limited by specific need. In one embodiment, table 702 implemented as a 16-entry table was found effective. In some instances, one or more specific page addresses may be selected (e.g., by software), while the remainder of table 702 may be populated by random sampling of the incoming write operations. In addition, not all the write operations are monitored. In some embodiments, the write operations are sampled at a predetermined rate (e.g., 1 per 1024 write operations, as desired or as empirically determined), and only certain write operations are monitored. For example, "house-keeping" write operations, such as wear-leveling migrations and refresh operations may be excluded.

At a predetermined event, such as when monitored write counter 703 or hit counter 704 it overflows (e.g., reaching $2^{20}$ and $2^{10}$, respectively, for a 20-bit counter and 10-bit counter implementation), the ratio of each "hits" field to the value in global write counter 703 ("hit rate") is examined. If the hit rate of any monitored address exceeds a threshold (e.g., higher than 1 in 1024 writes), an exception may be raised for further action. Further action may include, for example, a targeted refresh to any physical memory page corresponding to a monitored page address that is believed to be affected by the detected excessive accesses, an adjustment to the frequency of the triggering event, or any other suitable response. An eviction policy may be implemented to clear or partially clear table 702 from time to time for removing low hit rate monitored page addresses and to make room for new specifically monitored page addresses.

In the embodiment described above, logic or control circuit 103, which represents a memory controller circuit, is formed on a discrete semiconductor die or as part of an integrated circuit customized for use as a memory controller (e.g., an application-specific integrated circuit. In another embodiment of the present invention, such a memory controller may be integrated with or embedded in a general-purpose processor or configurable logic circuit (e.g., a central processing unit (CPU), a graphic processing unit (GPU), a communication circuit, or a field programmable gate array circuit). The functional blocks forming the memory controller may be formed concurrently with the general-purpose processor or logic circuit. Such embedding does not affect the memory controller's interface to the memory circuits, which is electrically and physically connected to the memory circuits, using any one of the techniques described above. As thus configured, the embedded memory controller need not include a host interface circuit but, in some instances, may communicate directly with the host general-purpose processor or logic circuit through interconnect lines formed. Such a configuration is sometimes considered a form of "in memory compute." In memory compute is particularly desirable in artificial intelligence and machine learning applications that are data intensive, and which require support of a considerable memory capacity in close proximity to the general-purpose processor or configurable logic circuit.

The above detailed description is provided to illustrate the specific embodiments and is not intended to be limiting. Numerous modifications and variations within the scope of the present invention are possible. For example, while the present invention is illustrated in this detailed description using "page" granularity as the migration unit, one may choose "word line" as the migration unit (i.e., a "word line replacement scheme"), without departing from the scope of the present invention.

Under a word line replacement scheme, each migration involves migrating all physical pages associated with the word line within the same memory bank. In one embodiment, there are 1024 memory banks in each memory bank, with 64 physical pages associated with each word line. In that embodiment, a migration under the word line replacement scheme may take 64 μseconds, if 1 μs is the expected latency for writing a page. During the migration, the corresponding memory bank would not be available. In that particular embodiment, the channel controller may issue a write command every 4 ns, so that the frequency of the triggering events must be much less frequent than once every 16,000 writes. As the number of word-lines are much less than the number of pages in a memory bank, the number of migrations in a replacement cycle for a word line replacement scheme is also much less than the corresponding number of migrations under a page replacement scheme. Therefore, in many implementations, the complete rotation cycle is much shorter under a word line replacement scheme. For example, in one implementation, using a 9-bit write counter (i.e., overflowing every 512 writes) in a wear-leveling pool of 64M pages and 1M word lines, the minimum time for a complete rotation is 292.5 years under a page replacement scheme, versus 0.07 years under a word line replacement scheme. Or, equivalently, it would take 2.91 complete rotations to reach $10^{11}$ write cycles under a page replacement scheme, but 186.3 complete rotations under a word line replacement scheme. For that embodiment, under a page replacement scheme, the expected lifetime of the memory module exceeds 851 years and 13.3 years under a word line replacement scheme.

The present invention is set forth in the accompanying claims.

The invention claimed is:

1. A memory device, comprising:
one or more memory circuits each organized as a plurality of physical memory pages, each physical memory page being associated with a physical page address, wherein each memory circuit, upon receiving a device read command or a device write command that specifies any of the physical page addresses, initiates a corresponding read or write operation on the physical memory page associated with the specified physical page address; and
a control circuit which comprises:
an external interface that receives from an external processor host read requests or host write requests, each host read request or each host write request specifying a host memory address;
an address mapping circuit configured to map each host memory address to a device memory page address in a device address space, each device memory page address being associated with a device memory page, the device memory page representing data to be stored or that is stored in one of the physical memory pages;
an ingress circuit which creates a device read command or a device write command based on each host read request or each host write request received over the external interface;
a migration circuit which creates migration read commands and migration write commands; and
a memory interface circuit, comprising:
an address translation circuit which maps each device memory page address to a corresponding physical page address; and
a command control circuit, which controls operations in the memory circuits for each read command, each write command, each migration read command, and each migration write command, providing to the memory circuits corresponding physical memory page addresses mapped by the address translation circuit,
wherein the migration circuit generates, using an address adjustment circuit, a modified device memory page address for each device memory page address, each modified device memory page address corresponding to a physical page address associated with the device memory page address; and upon occurrence of a triggering event, the migration circuit:
- (a) creates a migration read command to retrieve from one of the memory circuits data stored in a first physical memory page having a first physical page address associated with a first modified device memory page address;
- (b) creates a migration write command to write into one of the memory circuits the data retrieved by the migration read command into a second physical memory page having a second physical page address; and
- (c) revises the address mapping in the address translation circuit to map the second physical page address to the first modified device memory page address, upon successful performance of the migration write command; and wherein the device memory page address comprises a plurality of fields and the address adjustment circuit generates the modified device memory page address by applying a hash function on one or more fields of the device memory page address.

2. The memory device of claim 1, wherein the command control circuit carries out in received order the migration read command and the migration write command from each corresponding triggering event.

3. The memory device of claim 1, wherein the triggering event occurs after every predetermined number of completed write commands or upon an expiration of a timer.

4. The memory device of claim 3, wherein the triggering event also occurs after expiration of a timer that schedules a maintenance operation, if the expiration precedes the predetermined number of completed write commands.

5. The memory device of claim 1, wherein the triggering event occurs according to output value of a linear feedback shift register.

6. The memory device of claim 5, wherein the linear feedback shift register operates according to a polynomial.

7. The memory device of claim 3, further comprising a write frequency monitoring circuit that detects a frequency of write operations that involve a selected device memory page address.

8. The memory device of claim 7, wherein the frequency monitoring circuit raises an exception when the frequency of write operations exceeds a predetermined threshold.

9. The memory device of claim 8, wherein the frequency monitor circuit comprises a content-addressable memory circuit that implements a table of selected device memory page addresses and maintains a count value associated with each device memory page associated with the selected device memory addresses, the count value representing times the selected device memory page address is involved in device write commands.

10. The memory device of claim 8, wherein the exception results in the triggering event.

11. The memory device of claim 8, wherein the exception results in a change in frequency of triggering events.

12. The memory device of claim 1, wherein the triggering event occurs at regular time intervals.

13. The memory device of claim 1, wherein the physical memory pages in the memory device are associated with multiple channels and wherein the memory interface circuit is one of a plurality of memory interface circuits in the control circuit, and wherein each memory interface circuit controls operations in the memory circuits specific to one of the channels.

14. The memory device of claim 13, wherein the physical memory pages in each channel are organized into one or more wear-leveling pools.

15. The memory device of claim 14, wherein the memory circuit is one of a plurality of memory circuits in a memory module, each memory circuit being formed on a separate substrate, and wherein the physical memory pages of each wear-leveling pool reside on a single memory circuit.

16. The memory device of claim 14, wherein the memory circuit is one of a plurality of memory circuits in a memory module, each memory circuit being formed on a separate substrate, and wherein the physical memory pages of each wear-leveling pool reside on two or more memory circuits.

17. The memory device of claim 14, wherein the address translation circuit is one of a plurality of address translation circuits, each translation address circuit providing address translation specific to one of the wear-leveling pools.

18. The memory device of claim 14, wherein the memory interface circuit further comprises a write queue and a read queue for receiving device read and device write commands, respectively, received into the memory interface circuit.

19. The memory device of claim 18, wherein one of the wear-leveling pools is associated with a start-gap wear-leveling scheme that includes a designated physical memory page, and wherein the designated physical memory page is implemented as an entry in the write queue.

20. The memory device of claim 19, wherein the triggering event initiates a migration process that comprises a read phase and a write phase, corresponding respectively to operations associated with carrying out the migration read command and the migration write command.

21. The memory device of claim 1, wherein the address translation circuit comprises a look-up table.

22. The memory device of claim 1, wherein the device memory page address comprises the plurality of fields provided according to a first ordering and wherein the hash function is applied to modify the device memory page address by reordering the plurality of fields in the device memory page address to a second ordering different from the first ordering.

23. The memory device of claim 1, wherein the device memory page address comprises the plurality of fields and wherein the hash function is applied to modify the device memory page address by reordering bits in at least one of the fields of the device memory page address.

24. The memory device of claim 1, wherein the device memory page address comprises the plurality of fields and wherein the hash function is applied to one or more fields of the device memory page address to generate the modified device memory page address.

25. The memory device of claim 24, wherein the hash function is applied to perform a bit-wise exclusive-OR operation on a first group of fields in the device memory page address and a second group of fields in the device memory page address.

26. The memory device of claim 24, wherein the hash function is applied to perform a bit-wise exclusive-OR operation on a group of fields of the device memory page address and a seed value.

27. The memory device of claim 1, wherein the memory page address comprises plurality of fields corresponding to identifications of memory pages and memory banks of the one or more memory circuits.

\* \* \* \* \*